Inventor:
Josef Hurschler
By [signature] Atty.

April 25, 1961

J. HURSCHLER 2,981,790

CIRCUIT ARRANGEMENT FOR TRANSMITTING MESSAGES VIA TELEPRINTER EXCHANGES

Filed Feb. 19, 1958

2 Sheets-Sheet 2

Inventor:
Josef Hurschler.
By [signature] Atty.

United States Patent Office 2,981,790
Patented Apr. 25, 1961

2,981,790

CIRCUIT ARRANGEMENT FOR TRANSMITTING MESSAGES VIA TELEPRINTER EXCHANGES

Josef Hurschler, Bern, Switzerland, assignor to Siemens and Halske Aktiengesellschaft Berlin and Munich, a corporation of Germany Filed Feb. 19, 1958, Ser. No. 716,082

Claims priority, application Switzerland Feb. 21, 1957

6 Claims. (Cl. 178—2)

Figure 1:
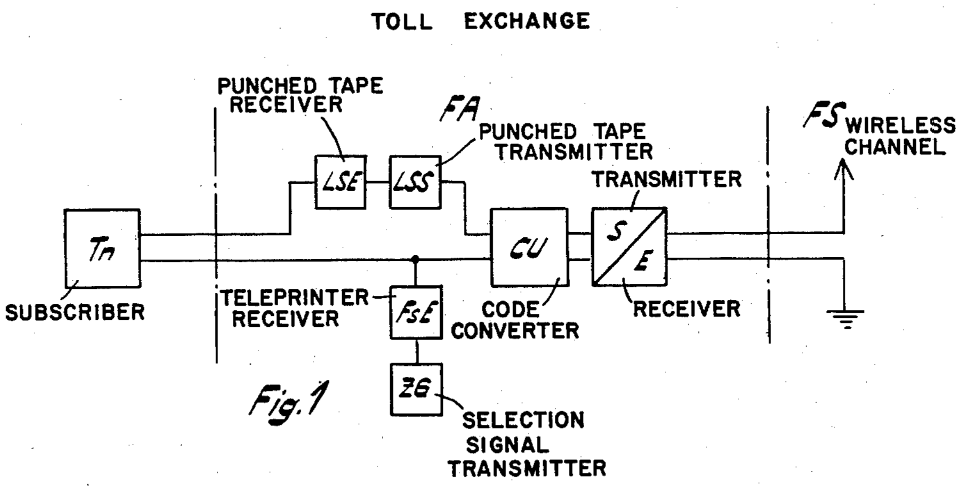

This invention is concerned with a circuit arrangement for transmitting teleprinter messages over duplex transmission channels and particularly over wireless channels, via teleprinter exchanges, comprising storage devices, provided in the transmitting channel, for receiving teleprinter signals.

It is known in the teleprinter communication art to use for the transmission of messages over great distances, for example, transoceanic connections, wireless channels instead of cables. The transmitter devices allotted to the wireless channels are constructed so that only impulses of certain length, for example, impulses such as they occur in any teleprinter alphabet, can be transmitted. Impulses of different length, such as occur, for example, in selection or dial impulse series, cannot be transmitted via these devices. For this reason, a subscriber connected to a telex network, who desires to select a subscriber similarly connected to a telex network beyond the wireless channel, is compelled to convert his dial or selection impulses which are on a numerical basis, into selection numbers coded in accordance with a teleprinter alphabet, before they are transmitted over the wireless channel. This conversion requires at the incoming side of the wireless channel an individual receiver-distributor which in turn controls a selection transmitter adapted to produce numerical selection pulses.

Since a conversion of the individual teleprinter signals, for example, from a five-element alphabet into a seven element alphabet, is for reasons of reliable operation carried out, at the transition from a telex network to a wireless channel, and since storage devices are required for this purpose, which are adapted to cope with transmittal congestions caused, for example, by slowing telegraph speed, the invention proceeds from the thought to utilize these storage devices, which are as such provided in the transmission channel, for the decoding of the selection pulses arriving via the receiving channel.

The problem posed is according to the invention solved by allotting to the storage devices switching means and a selection signal transmitter adapted to convert teleprinter signals into selection impulse series suitable for the control of switches, and by switching-in the storage devices into the receiving channel, during the building up of connections, so as to effect conversion of the selection digits incoming via the receiving channel in the form of teleprinter signals, into impulse series suitable for the control of switches.

It is in this manner possible to dispense for the decoding of the selection pulses incoming over the wireless channel, with an auxiliary receiving distributor for the receipt of teleprinter signals corresponding to the selection pulses.

In accordance with an embodiment of the invention, the individual selection numbers arriving in coded form may be stored in the storing device until such a time when a predetermined teleprinter combination indicates at the termination of the desired number, that the selection is terminated. This kind of storage results in the advantage that the selection signal transmitter only needs to recalculate or convert the teleprinter impulse combination but does not have to store it.

Figure 2:
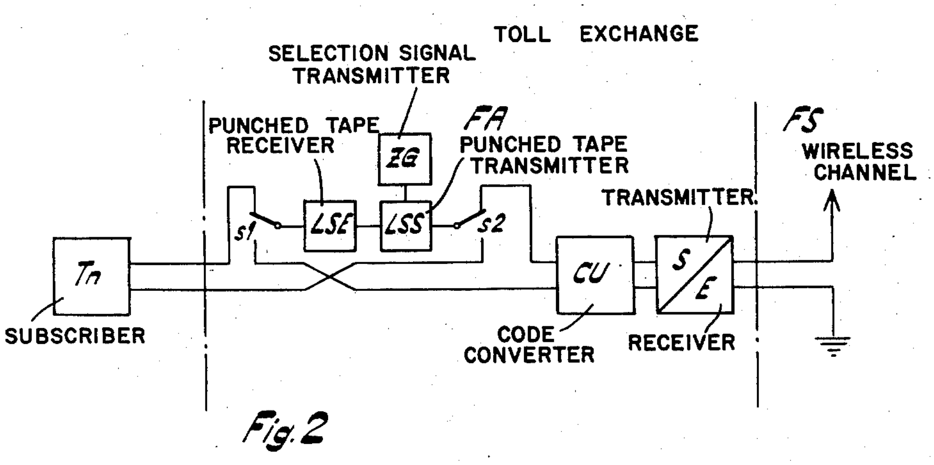
Figure 3:
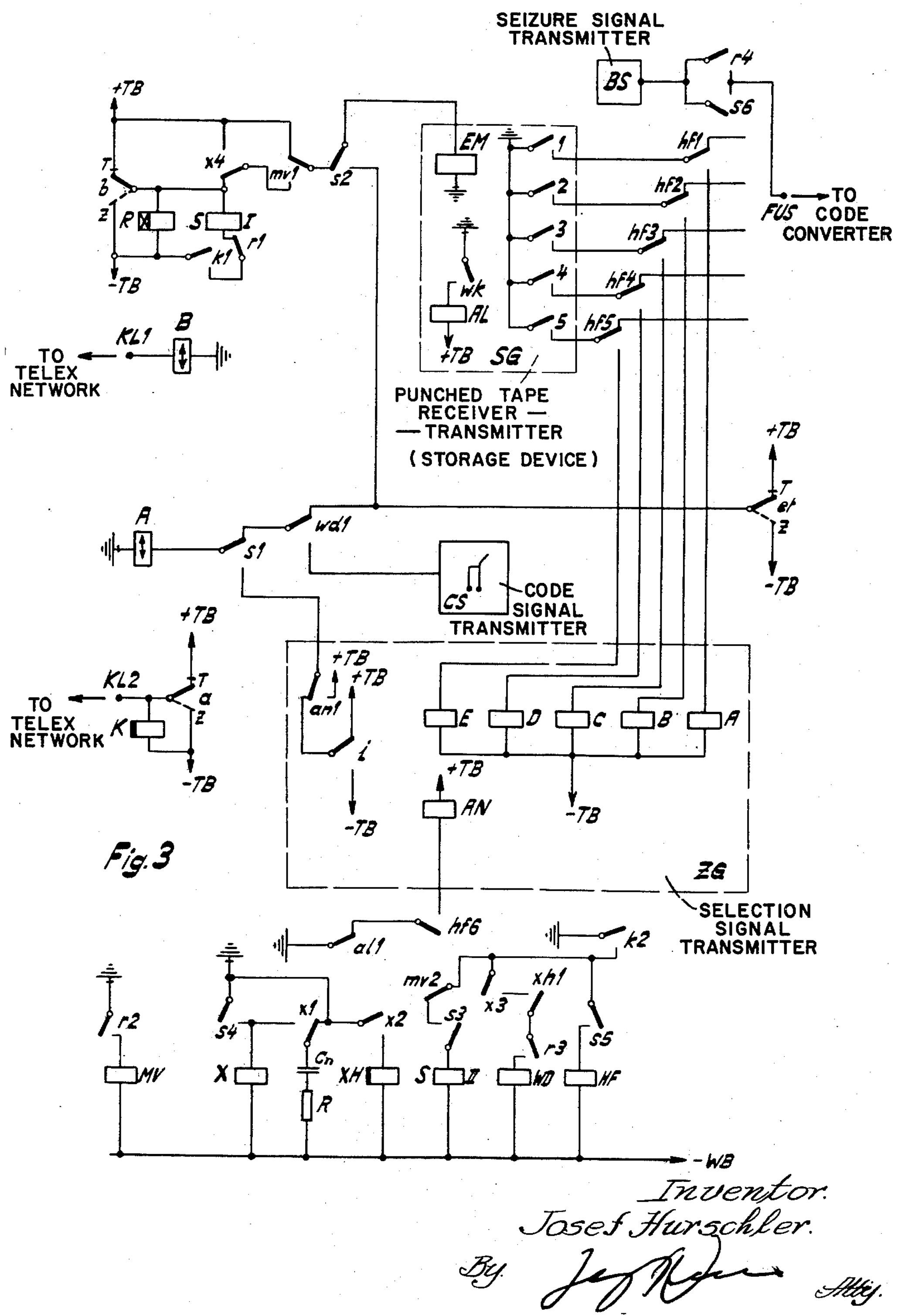

The various objects and features of the invention will appear from the description of an embodiment which will be rendered below with reference to the accompanying drawings, in which, Fig. 1 is a block diagram illustrating the present technique;

Fig. 2 is a block diagram illustrating a circuit arrangement according to the invention; and Fig. 3 shows a circuit of a switching arrangement according to the invention and disposed, for example, at the outgoing end of a wireless channel, comprising the details required for an understanding of the invention.

At the left of Fig. 1, there is shown a subscriber T*n* who is connected to a toll exchange FA over a selection network, details of which are omitted, the selection network being adapted to transmit the incoming messages via a wireless channel FS. The toll exchange FA comprises a punched tape receiver LSE serving as a storage device for the messages incoming via the telex network in the transmitter channel, a punched tape transmitter LSS, a code converter CU which converts or recalculates the incoming messages from the usual five element teleprinter alphabet to a seven element securing alphabet, and a transmitter S which transmits the messages via the wireless channel. The toll exchange FA is for the messages arriving via the wireless channel equipped with a receiver E and a code converter CU, a teleprinter receiver F*s*E, and a selection signal transmitter ZG. The teleprinter receiver F*s*E has the purpose of transmitting to the selection signal transmitter the selection numbers, arriving in the form of teleprinter impulse combinations, in the form of numerical values, the selection signal transmitter in turn transmitting these signals in the form of numerically constructed selection impulse series for the setting of directly controlled switches.

Fig. 2 shows generally the elements already described in connection with Fig. 1. However, in accordance with the invention, the storage devices LSE, LSS arranged in the transmitter channel, are connectable via a switch *s*1 and *s*2 to the transmitter channel as well as to the receiver channel, making it unnecessary to provide an individual teleprinter receiver for the control of the selection signal transmitter ZG. It should be considered that the storage devices LSE, LSS may not be in operation at a time when the subscriber lying beyond the wireless channel transmits selection impulses, because the desired subscriber may not be available, and therefore cannot transmit messages.

In the circuit arrangement illustrated in Fig. 3, there is connected a telex network to the terminals KL1 and KL2 and a code converter to the terminal FUS. The armature or contact *et* shown at the right is controlled by a relay (omitted) disposed in the code converter.

As already explained in connection with Fig. 2, there is provided a storage device in the transmitter channel from the telex network to the wireless channel, marked in Fig. 3 by SG, comprising a receiver punch and a punched tape transmitter. This storage device SG is represented only in its principal features, by the receiver magnet EM of the receiver punch and the five scanning contacts 1, 2, 3, 4 and 5 of the punched tape transmitter. The storage device and a selection signal transmitter ZG shown in the lower part of the figure may be switched to the receiver channel extending from the wireless channel to the receiver channel leading to the telex network.

The circuit arrangement shown in Fig. 3 operates as follows:

A seizure signal, from the wireless channel, is converted by the code converter and the armature or contact *et* is placed into the space position in which it is shown in the drawing. Relay A is thereby energized in space direction (+TB, contact *et* in space position T, *wd*1, *s*1, relay A to ground) and by switching its contact *a* into the space position T, transmits the signal indicating the desired seizure to the telex network connected to the terminal K2, at the same time closing an energizing circuit for relay K (+TB, contact *a* in space position T, relay K to —TB). Upon receipt of the exchange idle signal from the telex network, the receiver relay B connected to the terminal KL1 will be briefly energized in space direction, thereby closing at contact *b* a circuit for winding I of relay S over closed contact *k*1 of relay K (+TB, contact *b* in space position T, winding I of relay S, *r*1, *k*1 to —TB). Slow-to-operate relay R is not actuated in this circuit because the corresponding signal impulse is too short.

Relay S, upon energizing over its winding I, actuates its contact *s*1, thereby switching relay A to the selection signal transmitter ZG and thus making it independent of the further signals arriving from the wireless channel, the selection signal transmitter ZG maintaining the energization of relay A in space direction. Contact *s*2 of relay S is likewise actuated and effects the connection of the storage device SG to the receiving channel and contact *s*6 connects the wireless channel with a seizure signal transmitter BS, the latter producing a criterion or signal corresponding to the effected seizure of the telex network, thereby informing the subscriber at the other end of the wireless channel that he may begin with the transmission of the selection signal.

Relay S, upon operating, also actuates contact *s*3, thereby closing a circuit for its holding winding II, thus making itself independent of contact *b* of relay B, and closes at contacts *s*4 and *s*5 circuits for energizing relays X and HF, respectively. Relay HF, at contacts *hf*1 and *hf*5, connects the punched tape transmitter of the storage device SG with a group of relays A to E disposed in the selection signal transmitter ZG and, by closing its contact *hf*6, effects energization of relay A*n* disposed in the selection signal transmitter ZG. Relay A*n*, by switching over its contact *an*1, prevents transmission of selection signals prior to completion of storage thereof in the storage device SG.

Teleprinter impulse combinations corresponding to the individual selection numbers, arriving now from the wireless channel and the code converter CU are transmitted to the receiver magnet E*m* of the storage device SG and punched in a tape (+ or —TB, contact *et* respectively in space and mark position, contact *s*2, EM to ground). The receiver punch in the storage device SG has in known manner five selection ring contacts available, which are for simplicity of representation indicated by a single contact *wk*. As soon as these five contacts have assumed positions corresponding to the teleprinter impulse combination provided as a selection termination signal, a circuit will be closed for the actuation of the start relay AL. This start relay effects in known manner start of operation of the punched tape transmitter and, at contact *a*11, opens the energizing circuit of relay A*n* disposed in the selection signal transmitter ZG. Accordingly, upon actuation of relay AL in the storage device SG, and due to release of relay AN, the selection signal transmitter and also the punched tape transmitter of the storage device SG, will be ready for operation.

Responsive to scanning of the individual teleprinter impulse combinations recorded in the punched tape, contacts 1 to 5 in the storage device SG will be correspondingly set and the relays of the relay group A to E, in the signal transmitter ZG, will likewise be correspondingly actuated. These relays effect in known manner transmission of the received teleprinter impulse combination, in the form of a corresponding selection impulse series. For example, responsive to receipt of the teleprinter impulse combination "5," in the receiver punch, and transmission of this impulse combination through the medium of the punched tape transmitter of the storage device SG, the relays A to E of the selection signal transmitter ZG will be correspondingly actuated, and the impulse contact *i* of the selection signal transmitter will deliver five impulses to the relay A, such impulses providing for 60 ms. mark current and 40 ms. space current. Relay A transmits these selection impulses to the telex network by actuating its contact *a*.

Assuming that the desired subscriber connected to the telex network has been reached and prolonged space current has been transmitted in known manner from the telex network to the terminal KL1, indicating that the desired subscriber is available, relay B and therewith contact *b* will for a prolonged interval be in space position, thus permitting operative actuation of the slow-to-operate relay R. Relay R, upon actuating, operates its contact *r*2 to energize relay MV, the latter relay opening its contact *mv*2 and thus causing release of relay S by deenergization of its holding winding II. Relay S restores its contact *s*1, thereby switching the storage device SG back to the transmission channel leading from the telex network to the wireless channel. Relay R also closes contact *r*3 thereby closing a circuit for the energization of relay WD, such circuit being effective during the interval while relays X and XH, due to their release delay, keep contacts *x*3 and *xh*1 in closed position. Relay WD, at contact *wd*1 connects a code signal transmitter CS to relay A, such transmitter transmitting the combination "Who is There" and thereby prompting the subscriber, connected to the telex network, to transmit his identification text. The signals corresponding to such text are effective to operate relay B and the latter transmits them to the receiver magnet EM of the receiver punch in the storage device SG, by actuating its contact *b*, the circuit extending from + or —TB, contact *b* in its space and mark positions T and Z, respectively, *x*4, *mv*1, *s*2, EM to ground. The receiver punch accepts the corresponding signals and further transmission thereof to the code converter, not shown in Fig. 3, is effected through the medium of the punched tape transmitter by way of contacts *hf*1 to *hf*5 which are in the positions shown, the code converter causing transmission of the signals over the wireless channel.

The selection ring contacts provided in the receiver punch of the storage device SG, for the evaluation of the so-called selection-termination signal, may be constructed so that they are also adapted to evaluate a selection-cancellation signal. Such signal may, for example, be transmitted by the calling subscriber upon realizing wrong selection, and may be utilized for further stepping of the storage carrier without causing evaluation of the punched teleprinter impulse combinations by the punched tape transmitter and consequently without effecting setting of switches by the operation of the selection signal transmitter.

Instead of the selection ring contacts, there may be provided, for the control of the operation of the transmitter contact set of the punched tape transmitter, a second scanning contact set which is, for example, spatially displaced with respect to the transmitter contact set, to such extent that the transmitter conact set becomes operatively effective only responsive to the scanning of the selection-termination signal, scanning operation by the transmitter contact set, of the impulse combinations in the punched tape, prior to such selection-termination signal, being prevented.

Storage devices comprising magnetizable recording carriers may take the place of the described receiver punch and punched tape transmitter, respectively.

The invention is not inherently limited to the details and switching means included in the described and illustrated embodiment, but may be realized by utilizing other switching means, for example, electronic switching means.

Changes may, accordingly, be made within the scope and spirit of the appended claims.

I claim:

1. In a circuit arrangement for teleprinter exchanges which are interconnected over transmission paths comprising duplex operated wireless channels, a storage device in the transmission channel for recording messages to be transmitted over the transmission path, selector switches for extending the connection from a calling subscriber located at the far side of the transmission path to another subscriber at the near side thereof, a selection signal transmitter for recalculating coded selection digits arriving over the transmission path into numerical selection impulses for the setting of such selector switches to extend the desired subscriber connection, switching means connected with said storage device for selectively connecting the latter to the transmitting channel and to a source of teleprinter signals during transmission of such signals therefrom over the transmission path, and, during the building-up of a connection between subscribers, to the receiving channel and to said selection signal transmitter, for converting the coded selection digits incoming over the receiving channel, in the form of teleprinter signals, into such numerical selection impulses to control actuation of said selector switches for effecting the desired subscriber connections, and means operative after conclusion of the building-up of the connection for automatically switching said storage device back to the transmitting channel.

2. A circuit arrangement according to claim 1, wherein a teleprinter combination is transmitted over said wireless channel signifying termination of transmission of signals for the control of said switching means, and means in said storage device for storing said signals pending receipt of said teleprinter combination.

3. A circuit arrangement according to claim 1, comprising means in said selection signal transmitter for transmitting, prior to transmission of said selection impulse, signals required for the building up of the connection.

4. A circuit arrangement according to claim 2, comprising means in said storage device for cancelling signals stored therein.

5. A circuit arrangement according to claim 2, comprising two spatially mutually displaced scanning contact sets for the evaluation of said teleprinter combination signifying selection termination, one of said sets being responsive to the scanning of said combination effective to cause operative actuation of the other set for the transmission of the corresponding teleprinter signals.

6. A circuit arrangement according to claim 2, comprising selection ring contact means for evaluating the teleprinter signal combination signifying selection termination, said contact means being responsive to receipt of said termination signal effective to control transmission of the stored signals signifying numeral selection signals.

References Cited in the file of this patent

UNITED STATES PATENTS

| | | |
|---|---|---|
| 2,407,684 | Roberts | Sept. 17, 1946 |
| 2,454,498 | Bartelink | Nov. 23, 1948 |
| 2,457,434 | Bartelink | Dec. 28, 1948 |
| 2,483,732 | Mathes | Oct. 4, 1949 |
| 2,568,779 | Veaux | Sept. 25, 1951 |
| 2,667,533 | Zenner | Jan. 26, 1954 |
| 2,706,215 | Van Duuren | Apr. 12, 1955 |
| 2,766,318 | Bacon | Oct. 9, 1956 |
| 2,805,283 | Stiles | Sept. 3, 1957 |
| 2,894,074 | Elliot | July 7, 1959 |